May 28, 1940.  G. D. OWEN  2,202,229
TRANSPLANTER
Filed March 21, 1939
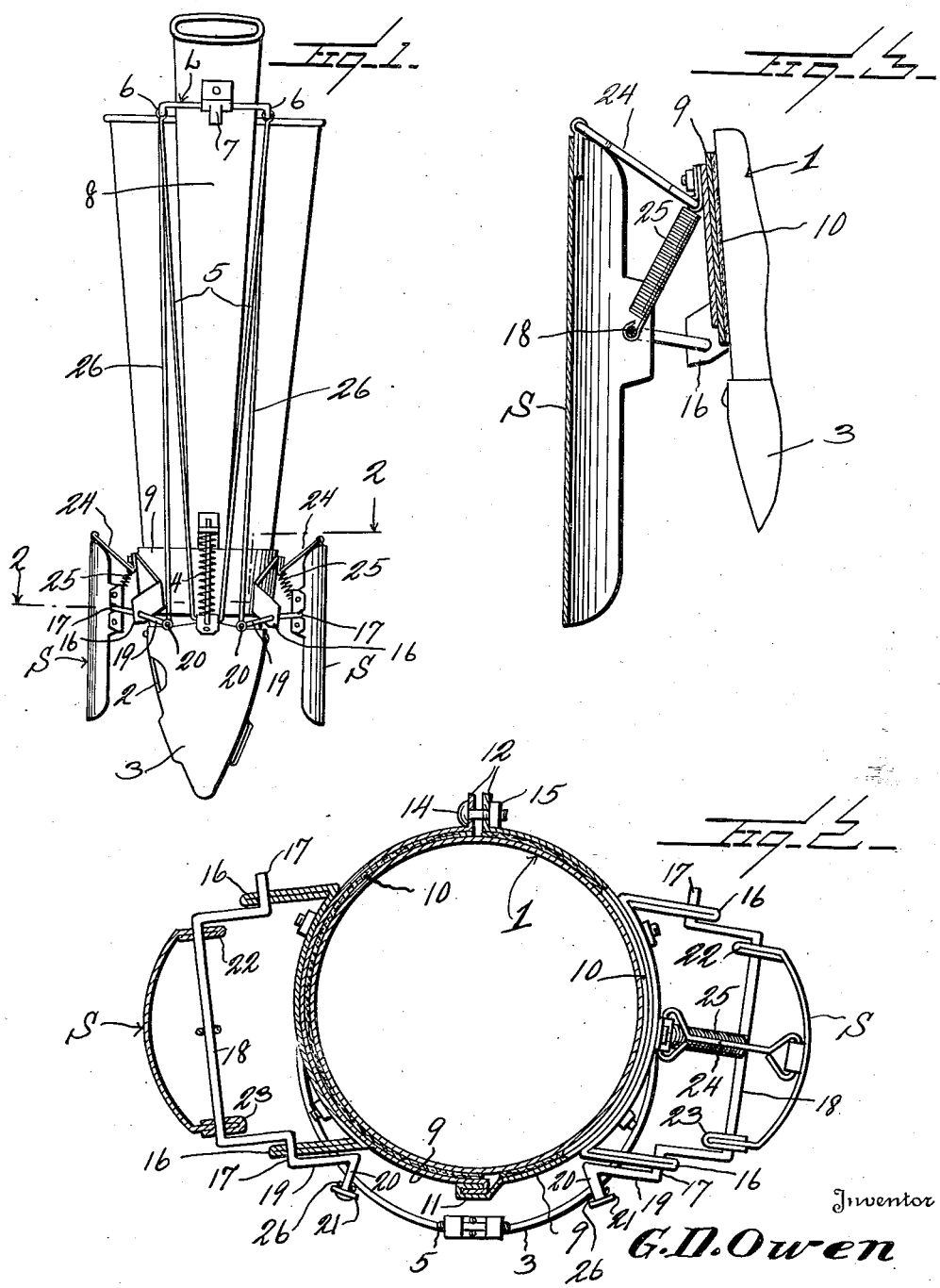
Inventor
G. D. Owen
By Watson E. Coleman
Attorney Patented May 28, 1940

2,202,229

UNITED STATES PATENT OFFICE 2,202,229

TRANSPLANTER

George D. Owen, Brookneal, Va.

Application March 21, 1939, Serial No. 263,289

1 Claim. (Cl. 111—4)

This invention relates to an attachment for transplanters, and it is an object of the invention to provide an attachment operating in substantially an automatic manner for packing soil around the roots of a plant at the time of transplanting whereby the plant will be properly supported by the soil.

It is a particular object of the invention to provide a soil packing means for a transplanter comprising a movable shovel which is caused to move in a direction to pack as shovels of the transplanter proper separate.

The invention consists in the details of construction and in the combination and arrangement of the several parts of my improved transplanter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is an elevational view illustrating a transplanter constructed in accordance with an embodiment of my invention;

Figure 2 is an enlarged sectional view taken substantially on the line 2—2 of Figure 1 looking in the direction of the arrows;

Figure 3 is an enlarged vertical sectional view taken through one of the packing shovels and the parts associated therewith, the adjacent portion of the transplanter being fragmentarily indicated in elevation.

As disclosed in the accompanying drawing, I denotes a body member or reservoir of desired dimensions and which has secured to its lower portion a stationary shovel 2 with which coacts a swinging shovel 3. The shovel 3 is constantly urged toward the shovel 2 by an expansible member 4.

The shovel 3 has operatively engaged with the upper portion thereof the rods 5 which in turn are operatively engaged with the side arms 6 of the operating lever for the transplanter. This lever L is pivotally held, as at 7, to the upper portion of the plant chute 8 and extends inwardly of the member or reservoir I to be readily grasped by the person using the transplanter.

The structure as hereinbefore set forth is substantially the same as comprised in the structure of the transplanter described and illustrated in Patent #2,034,530 which issued March 17, 1936, to Ward B. Owen and for which reason a further detailed explanation is believed unnecessary other than to state that the opening movement of the shovel 3 together with discharge of water from within the member or reservoir I is under control of the lever L.

My improved attachment as herein embodied includes two plates 9 of desired dimensions and which are adapted to be snugly engaged around the lower portion of the body member or reservoir I at a point closely adjacent to the shovels 2 and 3. These plates 9 have adhesively or otherwise secured to the inner faces thereof a fabric lining 10 to assure effective mounting of the plates upon the body member or reservoir I and without injury thereto.

End portions of these plates 9 are provided with flanges II which interlock after the plates 9 have been applied and the opposite end portions of the plates are provided with outstanding flanges 12 thru which holding bolts 14 are directed. These bolts 14, of course, have associated therewith nuts 15.

Each of the plates 9 at substantially its longitudinal center is provided with a pair of outwardly disposed spaced ears 16 which rotatably support a shaft 17 bridging the space therebetween. The portion of the shaft 17 between the ears 16 is formed to provide a crank 18 of desired throw. One end portion of the shaft 17 outwardly of an adjacent ear 16 carries an angularly related rock arm 19 terminating in an outwardly directed finger 20 disposed on an inward incline of about thirty degrees. The outer end portion of this finger 20 carries a surrounding enlargement or washer 21.

When the attachment is in applied position, the outer portion of each of the arms 19 and associated finger 20 contacts with the upper marginal portion of the shovel 3 so that as said shovel swings outwardly the crank 18 is swung inwardly for a purpose to be hereinafter more particularly referred to.

Coacting with the crank 18 of each of the shafts 17 is a packing shovel S. As herein disclosed this shovel S is of a length substantially equal to the length of a shovel 2 or 3 and is arcuate in cross section. The longitudinal marginal portions of the shovel S intermediate the ends thereof are formed to provide the outstanding flanges 22 and 23 with which the opposite end portions of the shaft 17 are operatively engaged.

Interposed between the upper portion of the shovel S and the associated plate 9 is a rigid link 24 of desired length and operatively engaged with the upper portion of said plate 9 is an end portion of a retractile spring 25 which is also operatively engaged with the crank 18 of the shaft 17. This spring 25 operates to normally maintain the shovel S in a raised position and with the rock arm 19 and the finger 20 thereof in contact with the upper marginal portion of the shovel 3.

As the shovel 3 swings into open position upon raising of the lever L, the shovels S will be caused to swing downwardly and inwardly and thereby closely pack soil around the plant and more particularly the roots thereof to assure the deposited plant being maintained erect and effectively set.

As the shovel 3 returns to closed position with respect to the shovel 2, the shovels S will be returned to their normal raised position under the action of the spring 25. It is believed to be obvious that in practice the shovel 3 is swung into open position after the normally closed shovels 2 and 3 have been forced into the soil.

To further assure the desired downward swinging movement of the shovels S, each of the rock arms 19 may be operatively engaged through the medium of a rod 26 with the lever L although under many conditions the use of such rod 26 may be dispensed with.

From the foregoing description it is thought to be obvious that a transplanter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A soil packing attachment for a transplanter including two shovels one movable outwardly with respect to the other and an operating means therefor, said attachment comprising a pair of shafts having cranks that can be swung downwardly, means for mounting said shafts upon the transplanter adjacent to the shovels, packing shovels mounted upon the shafts for movement therewith, means coacting with the packing shovels and cranks to cause the packing shovels to swing inwardly when the cranks are swung downward, rock arms carried by the crank shafts which contact with the movable shovel whereby when the movable shovel moves outwardly the shafts are caused to rotate in a direction to swing the packing shovels downwardly and inwardly, and means coacting with the packing shovels for regulating the downward movement thereof with the cranks.

GEORGE D. OWEN.